United States Patent [19]
Durney et al.

[11] Patent Number: 4,876,293
[45] Date of Patent: Oct. 24, 1989

[54] TEXTILE ADHESIVES COMPRISING A LATEX BINDER CONSISTING ESSENTIALLY OF STYRENE, BUTADIENE, AND MONOESTER OF MALEIC OR FUMATIC ACID

[75] Inventors: Cronin Rebecca L. Durney, Newark, Del.; Rutherford W. Scott, Concord; James F. Campbell, Cornelius, both of N.C.

[73] Assignee: Reichhold Chemicals, Inc., White Plains, N.Y.

[21] Appl. No.: 220,588

[22] Filed: Jul. 18, 1988

[51] Int. Cl.$^4$ .................. C08K 3/26; C08F 220/10; C08F 222/16; C08L 33/04

[52] U.S. Cl. .................. 523/122; 524/426; 524/427; 524/522; 524/523; 524/533; 524/555; 524/556; 524/558; 524/559; 524/819; 524/820; 524/821; 524/822; 524/823; 524/828; 526/318

[58] Field of Search ............... 526/318; 524/828, 820, 524/823, 819, 821, 822, 533, 555, 556, 558, 559, 522, 523, 426, 427; 523/122

[56] References Cited

U.S. PATENT DOCUMENTS

| | | | |
|---|---|---|---|
| 3,472,808 | 10/1969 | Isgur et al. | 526/318 |
| 4,381,365 | 4/1983 | Mishiba et al. | 524/534 |
| 4,420,599 | 12/1983 | Seki et al. | 526/318 |

*Primary Examiner*—Herbert J. Lilling
*Attorney, Agent, or Firm*—Rodman & Rodman

[57] ABSTRACT

The present invention is based upon the discovery that a styrene-butadiene composition contatining about 0.1 to 10 weight % of a monoester of maleic acid or fumaric acid provides improved bonding strength. In addition, small amounts of a functional monomer can also be included.

17 Claims, No Drawings

TEXTILE ADHESIVES COMPRISING A LATEX BINDER CONSISTING ESSENTIALLY OF STYRENE, BUTADIENE, AND MONOESTER OF MALEIC OR FUMATIC ACID

BACKGROUND OF THE INVENTION

1. Field of the Invention

This invention relates to the use of an improved adhesive latex for use as a carpet-backing adhesive.

2. Description of the Prior Art

U.S. Pat. No. 3,281,258 to Callahan discloses the use of rubbery copolymers of styrene and butadiene in the context of a gel latex wherein the gelling is produced by steaming a frothed latex.

In the manufacture of textile floor coverings, such as piled or tufted carpets or rugs, the fibers or yarn is needled or looped through the interstices or holes of a woven or non-woven primary cloth or web such as cotton, polypropylene, jute, or other natural or synthetic fibrous material.

The web or primary cloth is then coated with a latex adhesive, generally a carboxylated butadiene-styrene copolymer latex composition, or a plasticized vinyl chloride copolymer latex to help secure the bottom of the carpet tufts to the woven carpet fabric backing or web.

After drying, a backing is applied to the adhesive, generally in the form of a frothed vinyl polymer composition which is passed between crushing or embossing rollers to obtain the desired thickness, dimension or finish of the backed carpet.

The yarns or tufts of the carpet can be natural or synthetic organic fibers or mixtures. In addition, the yarns can vary from one type to another type. Examples of such yarn include silk, cotton, wool, hair, nylon, acrylics, polyester, polyvinyl chloride, vinyl chloride-vinyl acetate copolymers, polyurethanes, rayon, polyacrylonitriles, vinyl chloride or vinylidene chloride copolymerized with acrylonitrile, polyvinylidene chloride, polypropylene fibers and the like.

Glass fibers can also be blended or woven with the natural and/or synthetic fibers, which can contain fire-retardants, anti-static agents, bacteriostats, antidegradants, dyes, pigments, optical brighteners and the like.

U.S. Pat. No. 4,595,617 to Bogdany discloses latex or emulsion compositions of vinyl chloride and/or vinylidene chloride polymer or copolymer with filler and emulsified plasticizer frothed and used to coat and impregnate the back of a carpet which can be precoated by a carboxylated butadiene-styrene copolymer latex composition.

Additional information about the manufacture of carpets and especially tufted carpets can be found in "Carpets and Other Textile Floor Coverings," by Robinson, 2nd Edition, 1972 (Textile Book Service, Division of Bonn Industries, Inc., Trinity Press, London) and "Wellington Sears Handbook of Industrial Textiles," Caswell, 1963 (Wellington Sears Co. Inc., New York), the disclosure of which is incorporated by reference herein.

SUMMARY OF THE INVENTION

The present invention is based upon the discovery that a styrene-butadiene composition containing about 0.1 to 10 weight % of a monoester of maleic acid or fumaric acid provides improved bonding strength. In addition, small amounts of a specialty monomer such as a carboxylic acid or n-methylolacrylamide can also be included.

DESCRIPTION OF THE PREFERRED EMBODIMENTS

In accordance with the present invention, it has been found that a polymer emulsion of styrene-butadiene, with a monoester of maleic acid or fumaric acid provides increased bonding strength, especially when used as a textile adhesive with floor coverings comprising piles or tufts. It is also contemplated that the latex binder can be used as a non-woven binder, or a pressure sensitive additive.

More specifically, the styrene component is the preferred embodiment of an aromatic nucleus that can contain about 6 to 10 carbon atoms. An alkenyl group can also be directly linked to the aromatic nucleus, with the alkenyl group preferably containing about 2 to 4 carbon atoms. The styrene component can vary from about 2 to 90 weight %, preferably 30 to 80 weight % and most preferably 40 to 75 weight % by weight of the total composition.

The butadiene component is the preferred embodiment of an open chain aliphatic conjugated diene containing about 4 to 9 atoms and can vary from about 15 to 98 weight %, preferably about 20 to 70 weight % and most preferably about 25 to 60 weight % by weight of the total composition.

The monoester of maleic acid or fumaric acid, also known as monoester maleate or monoester fumarate has the following structural formula:

$$ROOC-CH=CH-COOH$$

wherein R is a $C_1$ to $C_{12}$, preferably a $C_1$ to $C_4$ alkyl group.

The monoester of maleic or fumaric acid can vary from about 0 to 10 weight %, preferably about 0.5 to 5 weight %, and most preferably about 1 to 4 weight % of the total composition.

The inventive composition can also contain up to about 10 weight %, preferably about 0.05 to 7 weight %, and most preferably about 0.1 to 5 weight % of a functional monomer such as a carboxylic acid, hydroxyl containing acrylic and methacrylic monomers, amides, and acrylic and methacrylic acid derivatives.

The carboxylic acids include acrylic acid, methacrylic acid, monomethyl itaconate, itaconic acid, fumaric acid, maleic acid, beta-carboxyl ethyl acrylate and mixtures thereof.

Crosslinking agents such as difunctional vinyl compounds and derivatives, divinyl benzene, N-methylol acrylamide, C1–C4 ethers of N-methylol acrylamide, diallyl maleate, di, tri, and tetra (meth)acrylates can be included in amounts up to 7 weight %, preferably 0.05 to 5 weight % of the total composition.

The following examples illustrate specific embodiments of the present invention. In the examples and throughout the specification, all parts and percentages are by weight, unless otherwise indicated.

EXAMPLE 1

The following polymer formulations were prepared in accordance with the following procedure:

| Component | Weight Percent | | |
|---|---|---|---|
| | Formula A | Formula B | Formula C |
| Styrene | 63 | 63 | 63 |
| Butadiene | 35 | 35 | 35 |
| Monomethyl itaconate | — | 2 | — |
| Monomethyl maleate | 2 | — | — |
| Acrylic acid | — | — | 2 |

| Component | Weight Percent | | |
|---|---|---|---|
| | Formula D | Formula E | Formula F |
| Styrene | 63 | 63 | 63 |
| Butadiene | 35 | 35 | 35 |
| Monomethyl maleate | 2 | — | — |
| Monomethyl itaconate | — | 2 | — |
| Acrylic acid | — | — | 2 |

60 parts per hundred parts of monomer (phm) of demineralized water were contacted with 0.05 phm ethylene diamine tetraacetic acid (EDTA), 0.1 phm sodium dicyclohexyl sulfosuccinate, 0.1 phm ammonium persulfate, 2.0 phm of a butadiene-styrene (BD/ST) seed latex (particle size 600 angstroms) in a continuous stirred tank reactor (CSTR). Added to this mixture was 6.3% styrene, 3.5% butadiene, 0.06 phm t-dodecyl mercaptan, and 2% of the carboxylic acid component: monomethyl maleate in Formula A, monomethyl itaconate in Formula B and acrylic acid in Formula C. The mixture was heated to 195° F. and maintained at that temperature for the remainder of the reaction. A mixture of 56.7% styrene, 31.5% butadiene, and 0.54 phm t-dodecyl mercaptan was then fed continuously into the reactor over a period of 5 hours. At the same time a mixture of 0.3 phm sodium dicyclohexyl sulfosuccinate and 10 phm of demineralized water was fed continuously for 5 hours into the CSTR, and a mixture of 0.7 phm ammonium persulfate with 20 phm demineralized water was also fed into the CSTR for 5.5 hours. The reaction was polymerized to 98% conversion and cooled. The pH was adjusted to 8.0-8.5 with ammonia.

In compounding the latexes for the purpose of coating a carpet, the pH of each latex was adjusted to 8.8 to 9.2 with ammonia. Up to 50 ppm of a suitable biocide was added to control contamination, along with up to 0.25% of antioxidant to control aging. 425 pts of dry calcium carbonate (calculated on 100 parts dry latex) was then added to the latex to bring the total system solids to 82.5%. 0.5 to 1.0 part (dry) of sodium lauryl sulfate was then added to the compound latex, and the viscosity was increased to 14,000-15,000 centipoise (cps) with sodium polyacrylate thickener. The latex was then foam coated onto the reverse side of a tufted carpet and then dried and cured in a 270°-300° F. oven for 5-10 minutes. Each carpet coated with the different formula latex was tested for delamination strength in accordance with ASTM D 3936, with the results tabulated as follows:

| ASTM D 3936 | Formula A | Formula B | Formula C |
|---|---|---|---|
| Delamination strength, lbs/3 in | 20.8 | 18.9 | 19.9 |

It is noted that the best delamination strength was obtained with the carpet coated with polymer latex Formula A. The improvement in delamination strength provides the carpet manufacturer with processing advantages in assembling the carpet, and increases the life expectancy of the carpet.

EXAMPLE 2

Three polymer compositions were formed with the following components in accordance with the following procedure:

60 phm of demineralized water were contacted with 0.05 phm EDTA, 0.1 phm sodium dicyclohexyl sulfosuccinate, 0.6 phm sodium salt of condensed naphthalenesulfonic acid, 0.1 phm ammonium persulfate, 2.0 phm of a butadiene-styrene seed latex (particle size 600 angstroms) in a CSTR. Added to this mixture was 2% of the carboxylic acid component, 6.3% styrene, 3.5% butadiene, and 0.06 phm t-dodecyl mercaptan. The mixture was heated to 195° F. and maintained at that temperature for the remainder of the reaction. A mixture of 56.7% styrene, 31.5% butadiene, and 0.54 phm t-dodecyl mercaptan was then fed continuously into the CSTR over a period of 5 hours. At the same time a mixture of 0.7 phm sodium dicyclohexyl sulfosuccinate and 10 phm of demineralized water was fed continuously into the CSTR for 5 hours and a mixture of 0.7 phm ammonium persulfate with 20 phm demineralized water was also fed for 5.5 hours into the CSTR. The reaction was polymerized to 98% conversion and cooled. The pH was adjusted to 8.0-8.5 with ammonia.

In compounding the latexes for the purpose of carpet coating, the pH of each latex was adjusted to 8.8 to 9.2 with ammonia. Up to 50 ppm of a suitable biocide was added to control contamination, along with up to 0.25% of an antioxidant to control aging. 100-200 pts of dry calcium carbonate (calculated on 100 parts dry latex) was added to the latex to bring the total system solids to 78.0%. The viscosity was increased to 8,000-9,000 cps with sodium polyacrylate thickener. The latex was then coated onto the reverse side of a tufted loop pile carpet which was then dried and cured in a 250°-280° F. oven for 10-20 minutes. The carpet was then tested for tuft bind in accordance with ASTM D 1335.

In the ASTM D 1335 test, the carpet backing was coated with a predetermined amount of latex, and the tensile force required to pull a cut loop from a cut pile floor covering was determined. The carpet sample for testing was large enough so that at least 5 pieces, each 6 inches wide and 8 inches long were cut from it. The results were as follows:

| ASTM D 1335 | Formula D | Formula E | Formula F |
|---|---|---|---|
| Tuft Bind, lbs average per tuft pull | 30.5 | 27.9 | 23.5 |

What is claimed is:

1. A latex textile binder composition consisting essentially of:
   (a) about 2 to 90 weight % styrene;
   (b) about 15 to 98 weight % butadiene;
   (c) about 0.1 to 10 weight % of a monoester of maleic or fumaric acid having the following structure:

wherein R is a C$_1$ to C$_{12}$ alkyl group, and wherein said composition has a viscosity of about 8,000 to 15,000 centipoise.

2. The composition of claim 1, also including up to about 10 weight % of a functional monomer selected from the group consisting of carboxylic acids, hydroxyl containing acrylic and methacrylic monomers, amides and acrylic and methacrylic acid derivatives and mixtures thereof.

3. The composition of claim 1 wherein (a) varies from about 20 to 70 weight %; (b) varies from about 30 to 80 weight %; and (c) varies from about 0.5 to 5 weight %.

4. The composition of claim 3 wherein (a) varies from about 25 to 60 weight %; (b) varies from about 40 to 75 weight %; and (c) varies from about 1 to 4 weight %.

5. The composition of claim 2 wherein the monomer varies from about 0.05 to 7 weight %.

6. The composition of claim 5 wherein the monomer varies from about 0.1 to 5 weight %.

7. The composition of claim 2 wherein the carboxylic acid is selected from the group consisting of acrylic acid, methacrylic acid, monomethyl itaconate, itaconic acid, fumaric acid, maleic acid, beta-carboxyl ethyl acrylate, and mixtures thereof.

8. The composition of claim 1, also including up to 7 weight % of at least one crosslinking agent selected from the group consisting of difunctional vinyl compounds and derivatives, divinyl benzene, N-methylol acrylamide, C1–C4 ethers of N-methylol acrylamide, diallyl maleate, di, tri, and tetra (meth)acrylates.

9. The composition of claim 1, adjusted to a pH of about 8.8 to 9.2 and includes up to about 100 to 425 parts of a filler.

10. The composition of claim 1, wherein R is a $C_1$ to $C_4$ alkyl group.

11. The composition of claim 1, wherein R is a $C_5$ to $C_{12}$ alkyl group.

12. The composition of claim 1, wherein the monoester varies from about 0.5 to 5 weight %.

13. The composition of claim 12, wherein the monoester varies from about 1 to 4 weight %.

14. The composition of claim 9, also including up to 50 parts per million of a biocide and up to 0.25 weight % of an antioxidant.

15. The composition of claim 1, having a delamination strength above about 20.

16. The composition of claim 1, having a tuft bind of at least about 28.

17. The composition of claim 1, having a tuft bind of at least about 30.

* * * * *

UNITED STATES PATENT AND TRADEMARK OFFICE
CERTIFICATE OF CORRECTION

PATENT NO. : 4,876,293

DATED : October 24, 1989

INVENTOR(S) : R. L. Durney Cronin et al

It is certified that error appears in the above-identified patent and that said Letters Patent is hereby corrected as shown below:

On the title page item [54] and in column 1, line 5, "FUMATIC" should be --FUMARIC--; and Item [75] Inventors: change "Cronin Rebecca L. Durney" to --Rebecca L. Durney Cronin--; change "Rutherford W. Scott" to --W. Scott Rutherford--.

Signed and Sealed this

Eleventh Day of February, 1992

Attest:

HARRY F. MANBECK, JR.

*Attesting Officer*    *Commissioner of Patents and Trademarks*